(12) United States Patent
McCall et al.

(10) Patent No.: US 7,847,709 B2
(45) Date of Patent: Dec. 7, 2010

(54) MULTIMODE VEHICLE LOCATION DEVICE AND METHOD

(75) Inventors: Clark E. McCall, Ann Arbor, MI (US); David T. Proefke, Madison Heights, MI (US); Ryan O'Keefe, Clawson, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 405 days.

(21) Appl. No.: 11/845,836

(22) Filed: Aug. 28, 2007

(65) Prior Publication Data

US 2009/0058685 A1 Mar. 5, 2009

(51) Int. Cl.
*G08G 1/123* (2006.01)

(52) U.S. Cl. ............. 340/988; 340/426.13; 340/539.13; 340/937; 701/213

(58) Field of Classification Search ................................. 340/539.11–539.21, 932.2, 988, 425.5, 937, 340/426.1–426.2, 426.13, 995.24; 701/213, 701/207
See application file for complete search history.

(56) References Cited

U.S. PATENT DOCUMENTS

| | | | |
|---|---|---|---|
| 5,173,686 A | | 12/1992 | Fujihara |
| 5,519,621 A | | 5/1996 | Wortham |
| 5,777,580 A | | 7/1998 | Janky et al. |
| 6,340,935 B1 | * | 1/2002 | Hall ......................... 340/932.2 |
| 6,392,592 B1 | * | 5/2002 | Johnson et al. ........ 342/357.07 |
| 6,405,125 B1 | | 6/2002 | Ayed |
| 6,529,142 B2 | * | 3/2003 | Yeh et al. .................... 340/988 |
| 6,637,896 B2 | | 10/2003 | Li et al. |
| 6,738,712 B1 | | 5/2004 | Hildebrant |
| 6,909,964 B2 | * | 6/2005 | Armstrong et al. .......... 701/207 |
| 7,003,318 B2 | | 2/2006 | Kota et al. |
| 7,058,433 B2 | | 6/2006 | Carpenter |
| 7,145,507 B2 | | 12/2006 | Luo et al. |
| 7,195,381 B2 | | 3/2007 | Lynam et al. |
| 7,195,382 B1 | | 3/2007 | Foote |
| 7,242,321 B2 | * | 7/2007 | New et al. .................... 340/988 |
| 7,260,473 B2 | | 8/2007 | Abe et al. |
| 7,545,259 B2 | * | 6/2009 | Luo et al. .............. 340/426.13 |

(Continued)

OTHER PUBLICATIONS

Shipley, C. "Digismart—Miniature Projection Technology," www.digislide.com.au/consumer/digismart.htm, 2006.

(Continued)

*Primary Examiner*—Brent Swarthout
(74) *Attorney, Agent, or Firm*—Ingrassia Fisher & Lorenz, P.C.

(57) ABSTRACT

A user carried electronic device and method therefore is provided for directing the user to a parked vehicle using several modes of operation. The device includes a display, a memory, an interface for receiving information downloads from the vehicle and a controller coupled thereto for managing operation of the device. The controller stores the downloaded information in the memory and presents RETURN-TO-VEHICLE information on the display in response to a user request. The downloaded information desirably includes photographic information concerning the parked vehicle's environment obtained by vehicle camera(s) or otherwise. Vehicle location information and vehicle location accuracy information may be included. The device desirably includes location tracking elements that, when operating, provide graphical directions back to the vehicle based on vehicle location information in the download. Photo images of the vehicle environment can be included and are presented automatically when the device tracking and/or vehicle location information is not reliable.

20 Claims, 8 Drawing Sheets

U.S. PATENT DOCUMENTS

| | | | |
|---|---|---|---|
| 7,558,057 B1 | 7/2009 | Naksen et al. | |
| 7,639,237 B2 | 12/2009 | Perkins | |
| 2003/0144034 A1 | 7/2003 | Hack et al. | |
| 2003/0164778 A1 | 9/2003 | Muramatsu | |
| 2005/0096106 A1 | 5/2005 | Bennetts et al. | |
| 2006/0111835 A1 | 5/2006 | Baker et al. | |
| 2006/0139155 A1* | 6/2006 | Kim | 340/426.18 |
| 2006/0234784 A1 | 10/2006 | Reinhorn | |
| 2007/0022445 A1 | 1/2007 | Arseneau et al. | |
| 2007/0126603 A1 | 7/2007 | Driscoll et al. | |
| 2007/0184852 A1 | 8/2007 | Johnson et al. | |
| 2007/0285401 A1 | 12/2007 | Ohki et al. | |
| 2008/0167806 A1 | 7/2008 | Wheeler et al. | |
| 2008/0172197 A1 | 7/2008 | Skipor et al. | |
| 2009/0051832 A1 | 2/2009 | Banks et al. | |
| 2009/0058685 A1 | 3/2009 | Mc Call et al. | |
| 2009/0091477 A1 | 4/2009 | McCall et al. | |
| 2009/0131129 A1 | 5/2009 | Yamazaki et al. | |

OTHER PUBLICATIONS

Bee, A. W., Non-final Office Action issued in U.S. Appl. No. 11/868,821, mailed on Oct. 2, 2009.

Swarthout, B., Office Action mailed Jan. 29, 2010, for U.S. Appl. No. 11/868,821.

Office Action dated Jul. 22, 2010, issued in U.S. Appl. No. 11/872,075.

Response to Office Action dated Oct. 18, 2010, filed in U.S. Appl. No. 11/872,075.

* cited by examiner

MULTIMODE VEHICLE LOCATION DEVICE AND METHOD

TECHNICAL FIELD

The present invention generally relates to an apparatus and method for locating a vehicle and, more particularly, to an electronic device and method for guiding a user to a parked vehicle.

BACKGROUND OF THE INVENTION

Many drivers, at one time or another, have experienced difficulty in locating a vehicle that they have previously parked. Malls, airports, and other large venues often feature parking garages or tiered parking structures that make losing a vehicle particularly easy and finding a misplaced vehicle particularly challenging. Portable electronic devices have been developed that may help a driver locate a parked vehicle. However, many of these devices include an integrated global positioning system (GPS) position finding capability, which must identify the GPS location of the vehicle before the relative position of the device may be determined. As a result of this GPS-dependency, such devices may fail to operate properly in areas where satellite reception is poor or lacking. Unfortunately, such areas may include parking garages, tiered parking structures, downtown areas surrounded by high-rise buildings, and other areas where vehicles are often parked. If the fob itself also employs a GPS positioning finding capability, this capability may also be inoperative when the fob is carried into a shopping mall, office building or other structure that is substantially opaque to the GPS signals. Other systems rely on local beacons or nodes placed in known locations in and around the parking areas or structures. By tracking its location relative to these nodes the device location can be determined. However, such beacon systems may fail to function if the device is carried into an office building or other structure where the beacon signals are no longer received.

Accordingly, there exists an ongoing need to provide a multi-mode parked vehicle location system that may guide a user back to his or her vehicle with or without the aid of satellite signals or local beacon signals and continue to operate even when such signals are not available. It is desirable that such a device be integrated into an existing electronic device of the type typically carried by a driver, such as a keyfob, cell phone, personal digital assistant (PDA), microcomputer, and so forth. Other desirable features and characteristics of the present invention will become apparent from the subsequent detailed description and the appended claims, taken in conjunction with the accompanying drawings and the foregoing technical field and background.

SUMMARY OF THE INVENTION

A multi-mode electronic device configured to be carried by a user is provided for directing the user to a parked vehicle. The multi-mode electronic device utilizes, if available, GPS location data and/or node location data provided by at least one local wireless node and vehicle location information provided by the vehicle. If such primary location determining functions are not available or not desired, the device makes use of automatically or manually provided photos of familiar landmarks in the vicinity of the parked vehicle to suggest to the user how to find the vehicle. Such photos may be combined with vehicle location information when available and presented together to further enhance the ease of locating the vehicle. One or more cameras on the vehicle automatically or manually record the local environment and landmarks as the vehicle is being parked and shortly thereafter. These photos and available vehicle location information are transmitted to the portable device as the user exits the vehicle, where they are stored until recalled by the user. These local environment and landmark photos can also be initiated by a user, either from the vehicle or by using a camera optionally included in the portable device. In this way, the user may photograph a prominent landmark near the vehicle. The electronic device includes an interface desirably wirelessly coupled to the vehicle, a controller and a memory for storing and processing the photos and other information provided by the vehicle and/or generated within the device, and a display for presenting such to the user on request. In a further embodiment, a dead reckoning navigation system, GPS navigation system and/or cell phone navigation interface may be provided in the device, whereby the controller can use information therefrom when available so as to provide the desired multimode capability. In a still further embodiment, the user may also be presented with information on the quality (accuracy) of the location information.

DESCRIPTION OF THE DRAWINGS

The present invention will hereinafter be described in conjunction with the following drawing figures, wherein like numerals denote like elements, and.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description. For convenience of explanation, the invention is described herein for the case of a keyfob used to control various aspects of a vehicle. But the invention is not limited to such a device and may be incorporated in portable phones, personal digital assistants (PDA), micro-computers, digital watches, digital audio file players (e.g., MP3 or MP4 players), digital video and/or DVD players, and other portable electronic devices. Accordingly, as used herein, the terms "keyfob" and/or "electronic device" are intended to include these and other portable electronic apparatus, irrespective of whether or not it includes a through-hole for attachment of a key. For the purposes of the present invention it does not matter what other electronic functions may be performed by the "keyfob" or "electronic device" of the present invention, provided that it incorporates one or more of the various embodiments described herein. Aspects of the present invention are described in terms of "photos" of the vehicle environment taken automatically or manually. As used herein, the terms "photo", "photographic" and "image" singular or plural are intended to have their broadest possible meaning and to include but not be limited to any type of graphical representation of a particular location or object or geographical region. Non limiting examples are maps and images obtained from an electronic camera, either still or in video format, and various translations or modifications of such images as may be performed by image processing, image enhancement, adjustment of clarity or contrast or color, shading, outline or wire-frame processing, and other well known image enhancement techniques to make the images more useful for their intended purpose. As used herein, these and other variations are intended to be included in the terms "photo", "photographic" and "image" singular or plural.

Figure 4:
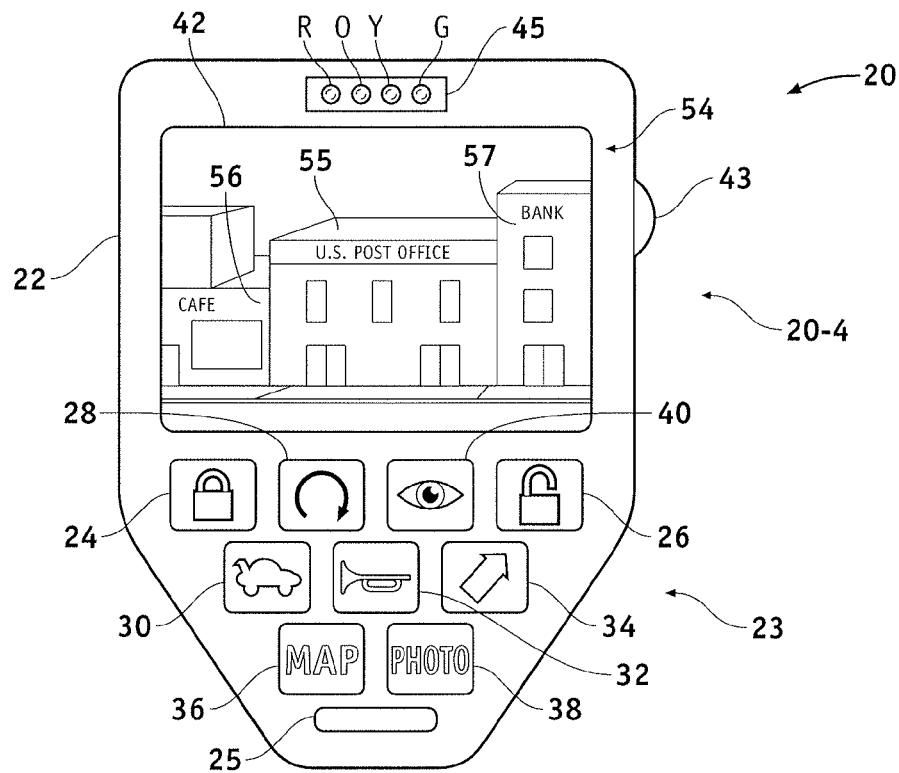
Figure 5:
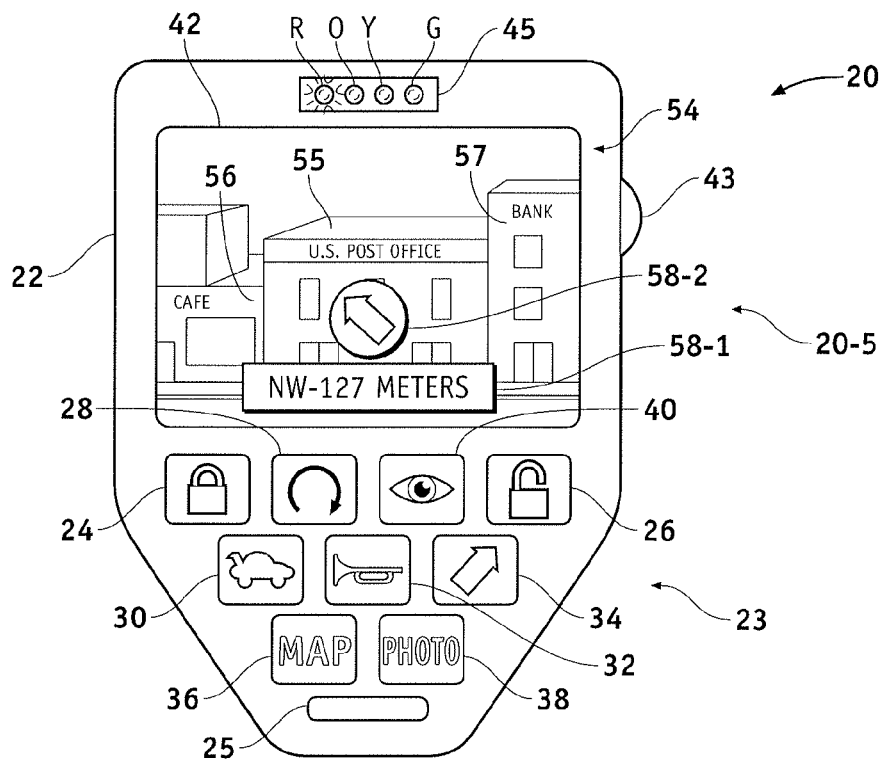
Figure 6:
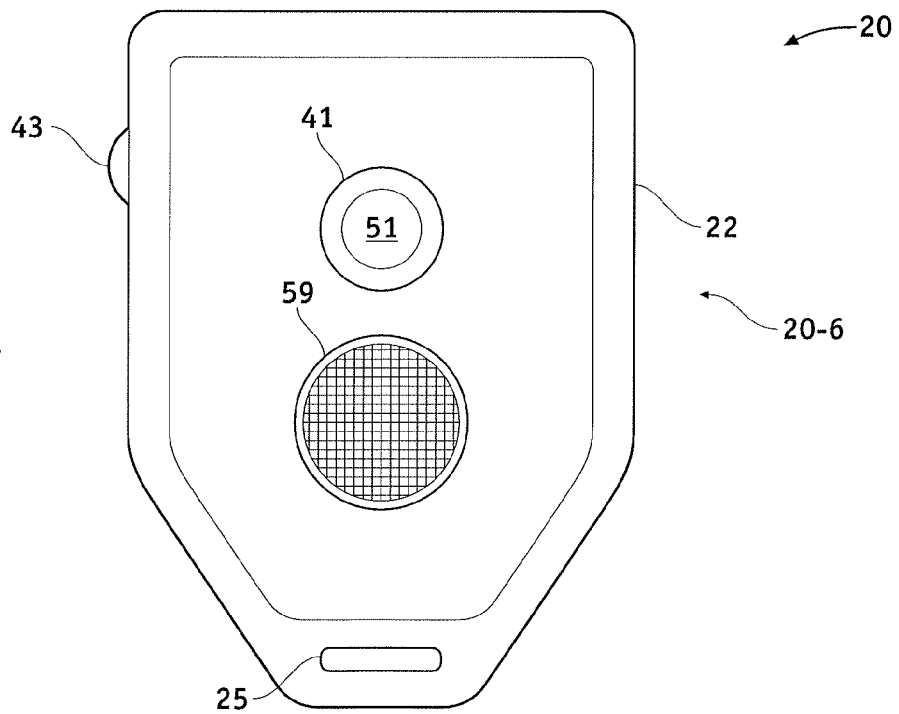
FIG. 6 is a plan view of a rear face of keyfobs such as those illustrated in FIGS. 1-5, showing further embodiments.

FIGS. 1-6 are plan views of keyfobs 20-1, 20-2, 20-3, 20-4, 20-5, 20-6 having parked vehicle location functions in accordance with various exemplary embodiments of the present invention. The convention is adopted of referring to the keyfobs illustrated in FIGS. 1-6 by the reference number 20-1 for FIG. 1, reference number 20-2 for FIG. 2, reference number 20-3 for FIG. 3, reference number 20-4 for FIG. 4, reference number 20-5 for FIG. 5 and reference number 20-6 for FIG. 6, respectively, and collectively as keyfob 20. FIGS. 1-5 show the same (front) face of keyfob 20 illustrating various controls and an output screen for different modes of operation. FIG. 6 shows the opposite (rear) face of keyfob 20 where, according to the embodiment of reference number 20-6, lens 44 of camera 41 is provided so that keyfob 20 itself can be used to take photos, and annunciator 59 is also optionally provided. Keyfob 20 comprises housing 22 having opening 25 there through that enables keyfob 20 to be attached to a key or keychain in the well-known manner. Opening 25 is desirable but not essential. A plurality of buttons or other user activated switches 23 are provided on the exterior of housing 22 and may include, for example and not intended to be limiting, DOOR LOCK button 24, DOOR UNLOCK button 26, REMOTE START button 28, TRUNK UNLOCK button 30, PANIC button 32, FIND PARKED VEHICLE buttons 34-38, and optional camera button 40, according to several modes of operation. As used herein, the term "button" is intended to include any form of user operable electronic switch, as for example and not intended to be limiting, a switch whose movement makes or breaks an electrical contact and various forms of proximity switches that make or break an electrical contact when a finger or stylus is brought into contact with or close to the switch, and so forth. For keyfobs equipped with an on-board camera, camera shutter button 40 is also desirably included. References herein to "depressing a button" are intended to include any means of activating switches 23 and not be limited merely to physical movement of a particular button or switch.

Keyfob 20 further comprises display 42 (e.g., a liquid crystal or other portable display) that may display status information (not shown) relating to a vehicle (or vehicles) associated with keyfob 20. This status information may include the vehicle's mileage, tire pressure, current fuel level, radio station settings, door lock status, etc., as well as information related to the vehicle location. Scroll wheel 43 is conveniently mounted on a side of housing 22 and utilized to navigate amongst such data and choices. For example, a user may rotate scroll wheel 43 to navigate between vehicular and/or vehicle location features and depress scroll wheel 43 to select a desired feature and view the information associated therewith. Keyfob 20 also desirably but not essentially includes light bar 45 with, in this example four LEDs or other colored lights. By way of illustration and not intended to be limiting, the light sources in light bar 45 are identified as showing show red (R), orange (O), yellow (Y) or green (G) colors when illuminated. As will be further explained, these lights are useful for providing information to the user on the quality (accuracy) of the available location information.

Figure 1:
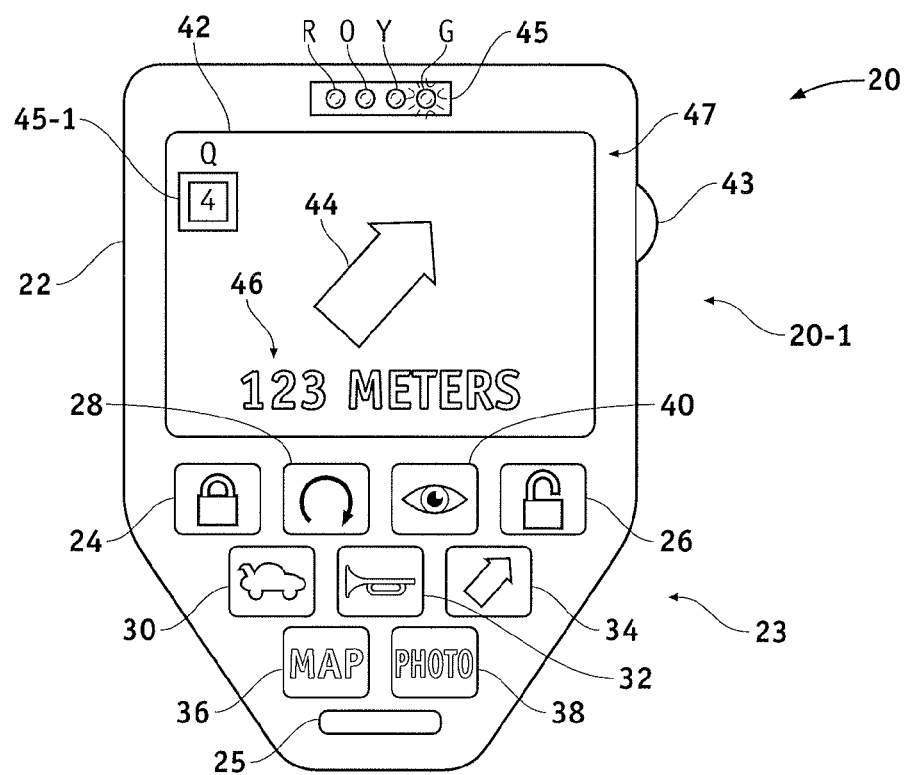
FIGS. 1-5 are plan views of front faces of keyfobs having a parked vehicle location function in accordance with exemplary embodiments of the present invention and illustrating different modes of operation.

When a user depresses any one of FIND PARKED VEHICLE buttons 34-38, keyfob 20 provides visual prompts on display 42 that may guide the user back to his or her parked vehicle in the manner described below. For example, as indicated in FIG. 1, if FIND PARKED VEHICLE button 34 of keyfob 20-1 is pressed, then RETURN-TO-VEHICLE information view 47 of arrow 44 may be generated on display 42 indicating the direction of the vehicle relative to the current position of keyfob 20, if such information is available. In addition, an estimated keyfob-to-car distance (e.g., 123 meters or feet or other convenient unit) may also be displayed on display 42 as shown at 46 of keyfob 20-1 of FIG. 1. In a further embodiment, light bar 45 may illuminate to indicate the quality of the location information presented at 44, 46 on display 42 or, for example, on-screen icon 45-1 may be provided to indicate a quality score Q (e.g., Q=4 in FIG. 1) associated with arrow 44 and distance 46 in RETURN-TO-VEHICLE information view 47. In the example of keyfobs 20, a 0 to 4 quality score or quality scale is used, where a green (G) light on light bar 45 and/or a quality score Q=4 in quality score icon 45-1 indicates the location data quality is excellent. Analogously, if no location in formation is available, then light bar 45 is dark and icon 45-1 indicates Q=0. If location information is available but its quality is poor (e.g., because of weak GPS or local beacon signals) light bar 45 illuminates red (R) and icon 45-1 shows Q=1. If the location information is adequate (e.g., because the GPS S/N ratio is adequate but only 3 satellites or two local beacons can be seen) quality light bar 45 shows orange and quality icon 45-1 would indicate Q=2. If the location information quality is good (e.g., good S/N ratio and 3-4 satellites and/or 3 or more local beacons available) then light bar 45 shows yellow (Y) and on-screen icon 45-1 would show Q=3. If the location information quality is excellent (e.g., excellent S/N ratio and more than 4 satellites and/or 4 or more local beacons available) then light bar 45 shows Green (G) and on-screen icon 45-1 would show Q=4. The above-mentioned criteria for identifying the various location data quality levels are intended to merely examples and not limitations. Persons of skill in the art will understand that a wide variety of criteria for determining location information quality can be adopted depending upon the needs of the particular system and the location tracking features incorporated in the system, and that any suitable criteria can be used, including but not limited to those examples presented above.

Figure 2:
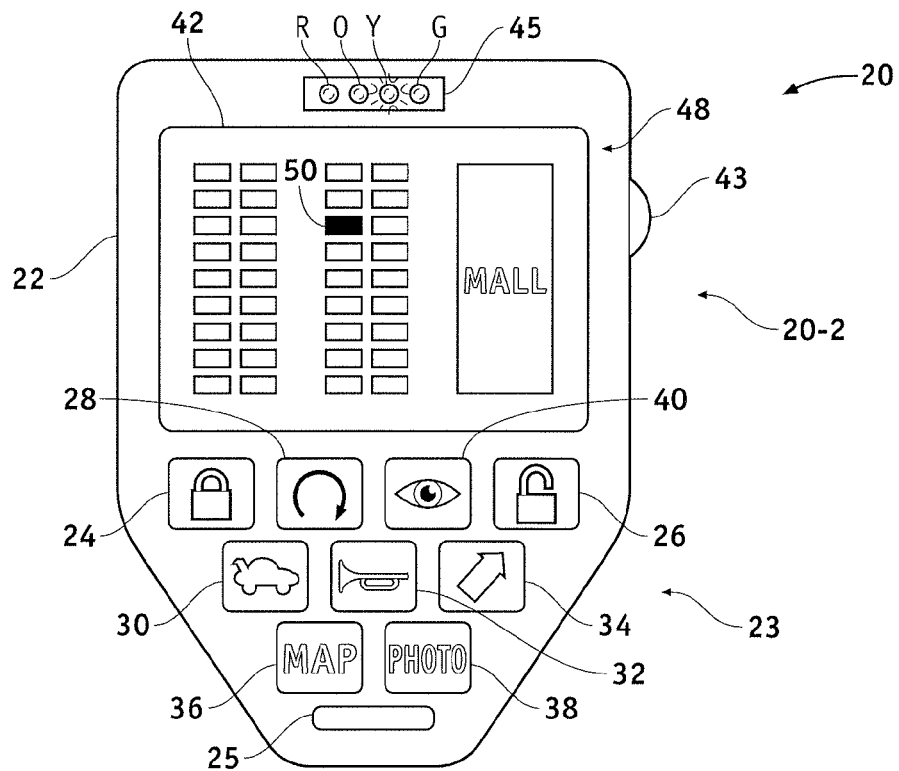

Referring now to keyfob 20-2 of FIG. 2, if FIND PARKED VEHICLE button 36 is depressed, overhead view 48 (if available) of the local parking area may be presented on display 42 with the position of the vehicle indicated at location 50. This overhead view can be constructed by manipulating the local environment images acquired by the vehicle as it is being parked, or from images available from an off-board repository, such as a database of satellite images, or from images provided by local cameras in the parking area that are wirelessly transmitted to the vehicle (or the keyfob). The generation of this overhead view can occur onboard the vehicle using the vehicles electronic systems, or generated by a remote server (e.g., a satellite or a local parking facility security system) that wirelessly transfers the processed image to the vehicle for transfer to the fob and/or to the fob directly. Any of these arrangements is useful. In the example of keyfob 20-2, it assumed that the location information quality is good so that light bar 45 shows yellow (Y). Referring now to keyfob 20-3 of FIG. 3, when FIND PARKED VEHICLE button 36 is depressed, map view 52 of the local area is provided with the position of the vehicle indicated at location 54. The map information can be stored in the vehicle as a part of its on-board navigation system or downloaded from a local beacon server or elsewhere. In the example of keyfob 20-3, it assumed that the location information quality is fair so that light bar 45 shows Orange (O).

Figure 3:
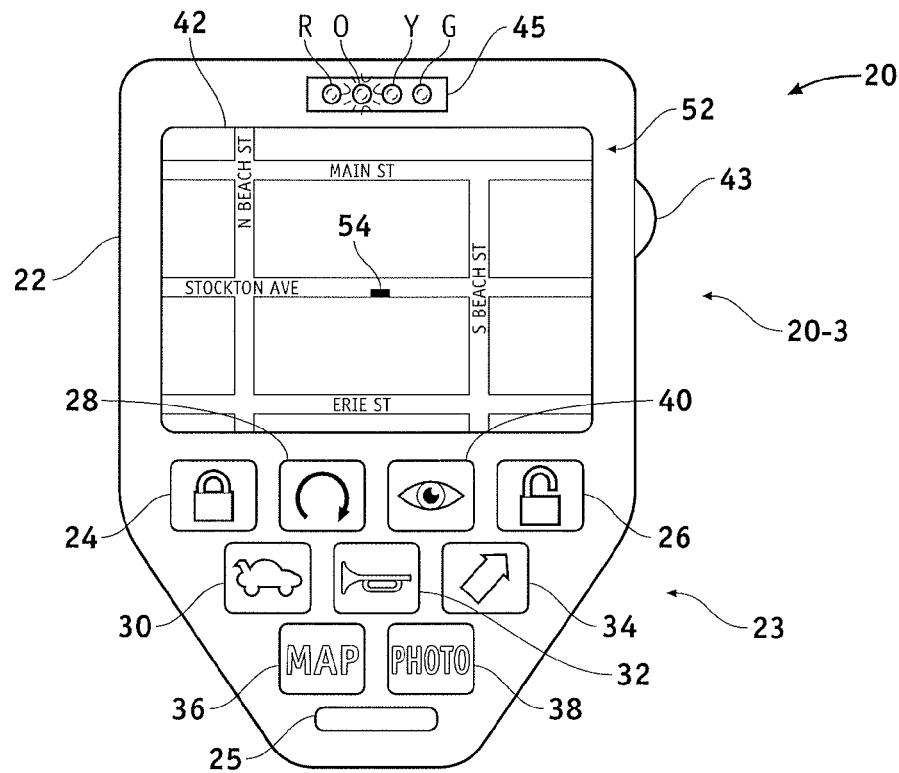

It will be appreciated that the FIND PARKED VEHICLE location information illustrated in displays 42 of keyfobs 20-1, 20-2 and 20-3 of FIGS. 1-3, is most conveniently obtained by using navigation information obtained from the vehicle and/or generated within keyfob 20, for example, from GPS or local node data, combined if necessary with GPS and/or dead reckoning data developed within keyfob 20, as the user moves away from the vehicle. Such location information can be combined with local map information downloaded from the vehicle into the keyfob as the user exits the vehicle, to provide the information shown on displays 42 of keyfobs 20-1, 20-2, 20-3. However, if the vehicle or the keyfob is unable to receive accurate GPS or local node location information, then the keyfob may be unable to provide the types of FIND PARKED VEHICLE information displays described above. In that circumstance, a further mode of operation is employed, as illustrated for example, by keyfob 20-4 of FIG. 4.

Referring now to keyfob 20-4 of FIG. 4, when FIND PARKED VEHICLE button 38 is pressed, then one or more photos taken from the vehicle before, during or after being parked, is presented on display 42, as is shown, for example, by photo 54 on display 42 of keyfob 20-4. In this example, photo 54 shows the front of an easily recognizable nearby landmark, e.g., U.S. Post Office 55 located between café 56 and bank 57, from which the user could readily infer that the vehicle is parked across the street from these buildings. By manipulating scroll wheel 43 other views from the current vehicle location can also be presented, e.g., looking from the sides, from the front, from the back of the vehicle, etc., so as to offer further clues to the vehicle location, that is, where it is parked. As will be subsequently explained, photographs of the vehicle's environment are automatically taken as the vehicle is being parked (or just afterward), and then transferred to the keyfob when the user exits the vehicle, and stored therein for subsequent display when FIND PARKED VEHICLE button 38 is activated. Such photos can also be manually taken at the user's request using the vehicles cameras. Under these circumstances where no location information is available, light bar 45 is dark, as shown in FIG. 4.

In a further mode of operation according to a further embodiment of the invention wherein keyfob 20-6 include camera 41 (see FIG. 6), the fob user may elect to manually take a photo directly with the fob when exiting the vehicle. This insures that a user chosen, easily remembered, landmark is captured in such a photo. Taking the photo with keyfobs 20-4, 20-5, 20-6 is accomplished, for example and not intended to be limiting, by pressing button 40, e.g., once to turn on keyfob camera 41 and a second time to record the photo. When camera 41 is turned on, photo image 54 being seen by keyfob lens 51 is shown on display 42. Keyfob lens 51 is conveniently but not essentially located on the opposite face of keyfob 20-4, 20-5 from display 42 and is shown in FIG. 6 and image 54 captured thereby is shown on display 42. As noted earlier, scroll wheel 43 may be used to scan through the various photo images stored in keyfob 20-4, 20-5 whether derived from the vehicle camera(s) or keyfob camera 41 or both. By rapidly operating or holding down button 40, the user may take a sequence of photos that can be displayed in rapid succession, i.e., like a video.

FIG. 5 shows keyfob 20-5 illustrating another mode of operation of key keyfob 20 that can be activated by, for example and not intended to be limiting, depressing buttons 34 and 38 together. In this circumstance, the RETURN-TO-VEHICLE (RTV) location information, e.g., "NW-127 Meters" legend 58-1 and/or directional arrow 58-2, is superimposed on the photo information (e.g., on photo image 54). According to a further embodiment of the invention and depending on the desires of the user, this dual mode of operation may be selected as a preferred mode of operation that is stored within keyfob 20 so that only a single button need be activated to obtain it. In a still further mode of operation, this dual mode of operation (location+photo information presented at the same time), may be invoked automatically by keyfob 20 when the quality (e.g., the accuracy) of the location information falls below a predetermined standard. It is well understood, for example, that the quality of GPS or beacon node location information depends upon the number of satellites or nodes that are within range of the GPS navigation system receiver or the node beacon receiver, and the received signal to noise (S/N) ratios. Presentation of combined location information and photo information is explained more fully in connection with FIGS. 9 and 11. In the example of FIG. 5, the location information quality is assumed to be poor and therefore light bar 45 shows a red (R) light, but this is not essential. On-screen icon 45-1 could also be provided showing, in these circumstances, Q=1.

Keyfob 20 of FIGS. 1-6 preferably communicate with the associated vehicle(s) via radiofrequency signals; however, it should be appreciated that other wireless and non-communications means may be utilized as well, including, but not limited to, an induction-based means, a low frequency (e.g., 10-300 kHz) communication means or an optical wireless means. Furthermore, other embodiments may comprise a keyfob that communicates with a vehicle over a hard wire connection; e.g., a keyfob that carries an electrical connector (e.g., a D-subminiature connector, a multi-pin USB connector similar to that employed by a portable flash drive device, etc.) that permits electrical communication with the vehicle when the keyfob is inserted into a docking station in the vehicle. Further, notwithstanding the various example illustrated in FIGS. 1-6 employing visual display 42 adapted to provide graphic images and/or photos, it should be appreciated that other embodiments of keyfob 20 may utilize other visual indications to guide a user back to the vehicle. For example, light bar 45 may be used as a direction indicator in addition to its function as a quality indicator. In still other embodiments, keyfob 20 may produce audible signals in addition to or in lieu of visual signals, as for example by means of annunciator 59 of FIG. 6. A non-limiting example of such non-visual signals are spoken directions, e.g., "walk north 100 meters, then west 23 meters, etc., to find the vehicle." Such audio instructions are conveniently generated based on the fob knowing the location of the vehicle and its current location and calculating the compass directions and distances to return, and/or remembering the directions and distances traveled from the vehicle to reach the current location. Either arrangement is useful.

Figure 7:
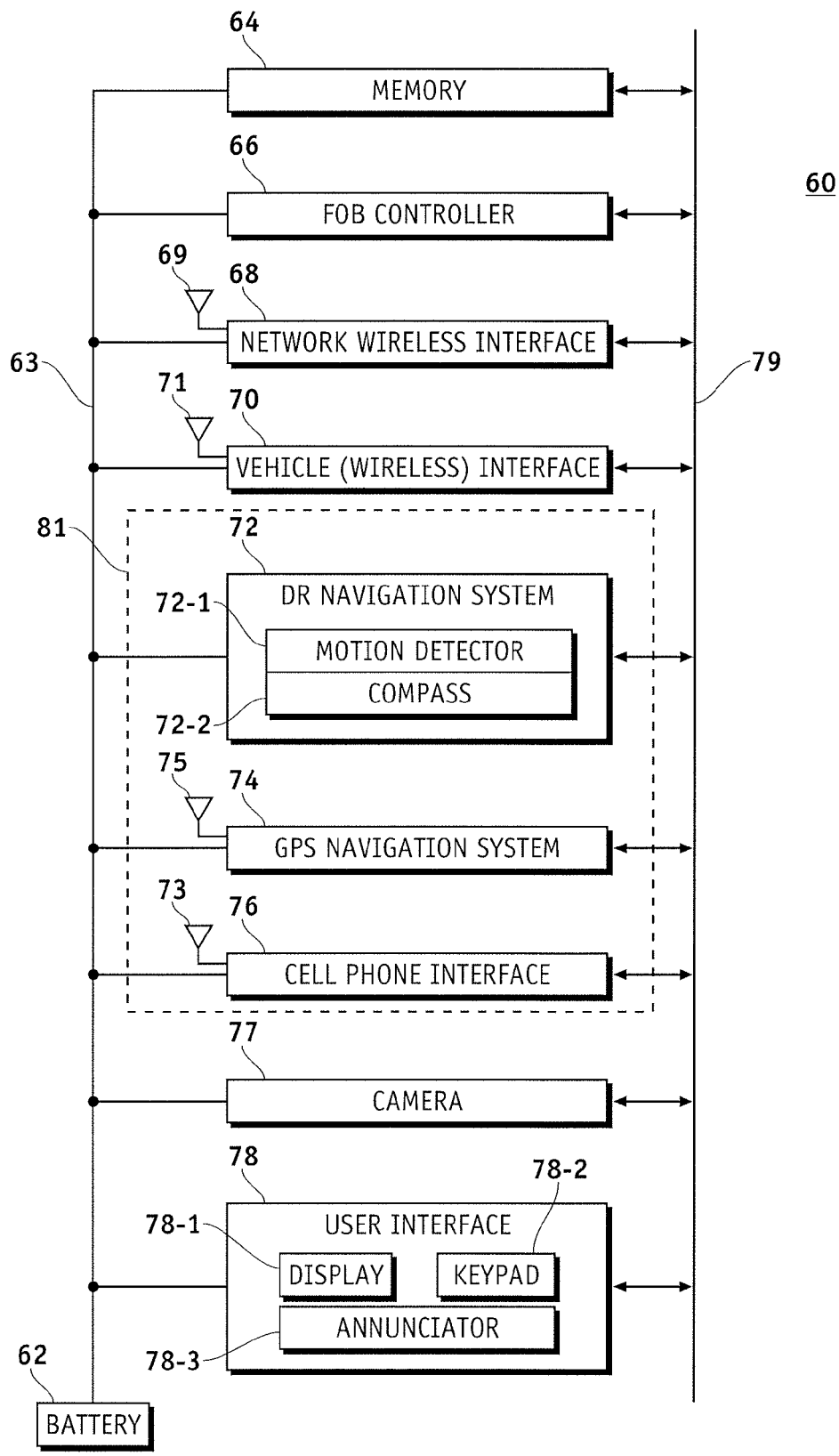
FIG. 7 is a block diagram of a vehicle location system that may be incorporated into a portable electronic device, such as the keyfobs shown in FIGS. 1-6, according to still further embodiments.

FIG. 7 is a block diagram of vehicle location system 60 adapted to be incorporated into a portable electronic device, such as keyfob 20 shown in FIGS. 1-6. Various subsets or all of the elements illustrated in FIG. 7 may be incorporated in various embodiments of the invention, depending upon the functions desired to be included in keyfob 20. System 60 comprises battery 62 for supplying electrical power via power bus 63 to various elements 64-78 of system 60. As used herein, the term "battery" is intended to include any sort of portable electrical energy source, as for example and not intended to be limiting, chemical cells, fuel cells, storage capacitors, solar cells, thermoelectric generators, mechanical generators, nuclear powered cells, and combinations thereof. Battery 62 may include a power conservation capability (not shown) that disconnects various elements of system 60 when not in use. This is desirable but not essential.

System 60 comprises memory 64 in which resides the software for operating system 60 as well as data downloaded from the vehicle and/or local beacons or satellites, and other data generated within system 60. Memory 64 desirably has non-volatile and volatile portions for long term and transient storage of information and data. System 60 further comprises: keyfob ("FOB") controller 66 that manages the operation of system 60; optional network wireless interface 68 with antenna 69 for communicating with an external network as for example and not intended to be limiting, a network of local nodes; vehicle interface 70 (with antenna 71 when interface 70 is a wireless interface) for communicating with the related system (see FIG. 8) located in the vehicle and by which location information, map information, photos, etc., may be downloaded from the vehicle to the keyfob; optional dead reckoning (DR) navigation system 72 incorporating for example and not intended to be limiting, motion detector 72-1 and electronic compass 72-2 for determining the current location of the keyfob based on a known starting point (e.g., the vehicle) and movement tracking using the motion detector and compass; optional GPS navigation system 74 with antenna 75 adapted to receive signals from various GPS satellites from which the current position of the keyfob can also be determined; optional cell phone interface 76 with antenna 73 adapted to utilize available local cell-phone sites for determining the position of the keyfob; optional camera 77 (analogous to camera 41 of FIG. 6) for photographing the local environment, and user input-output (I/O) interface 78 comprising, for example, one or more displays 78-1 analogous to display 42 of FIGS. 1-5, keypad or other user activated input devices 78-2, for example, analogous to buttons 24-40 of keypad 20 of FIGS. 1-5, and annunciator 78-3. Annunciator 78-3 (analogous to annunciator 59 of FIG. 6) may include both audible and/or visual indicators (e.g., a loudspeaker, buzzer, one or more flashing lights such as in light bar 45, etc.). Elements 64-78 are coupled via bus 79. System 60 is illustrated as using serial bus 79 for coupling elements 64-78 that exchange, send or receive information, but persons of skill in the art will understand that the invention is not limited merely to systems employing a serial bus and that the various elements 64-78 may be coupled in other ways, as for example and not intended to be limiting, by parallel connections to fob controller 66 or a combination of serial and parallel connections. Antennas 69, 71, 73, 75 may each be single antennas or a plurality of antennas or an array of distributed antennas, depending upon the vehicle and desired antenna configuration.

User interface 78 of FIG. 7 may comprise any indication means suitable for providing a user with information useful in locating a parked vehicle. Interface 78 may be, for example, a sound generator such as annunciator 59, 78-3 or visual signal generator 78-1 (e.g., a display, such as display 42 shown in FIG. 1) and including light bar 45. Similarly, vehicle interface 70 may comprise any device suitable for receiving data from a vehicle indicative of the vehicle's location including the photographs previously described For example, interface 70 may comprise a wireless transceiver, such as an RF transceiver having antenna 71 adapted to operate at a desired frequency; e.g., Frequencies at or around 315 MHz and 434 MHz are commonly used. Alternatively, interface 70 may be a wired interface wherein keyfob 20 plugs into a docking station in the vehicle.

Network wireless interface 68 with antenna 69 is configured to receive signals broadcast by nearby wireless network nodes (e.g., local beacons for known location), and to provide related signals to controller 66. To this end, controller 66 and network interface 68 may be configured in accordance with common compatibility standards for wireless local area networks (e.g., Wi-Fi standards) or for personal area networks (e.g., Bluetooth standards). In certain exemplary embodiments, controller 66 and network interface 68 may be configured in accordance with low data transmission rate networks (e.g., IEEE 802.15.4, such as a Zigbee network). Such low data rate standards have a data transmission rate slower than that of Wi-Fi or Bluetooth standards (e.g., 250 Kbps at 2.4 GHz), but consume relatively little power and thus may help prolong the life of battery 62. For this reason, adapting controller 66 and network wireless interface 68 to operate at low data transmission rate standards may be especially desirable in embodiments wherein battery 62 is not adapted to being frequently recharged.

As indicated above, dead reckoning (DR) navigation system 72 may include motion detector 72-1. Motion detector 72-1 may comprise any movement-sensitive device. For example, motion detector 72-1 may comprise a circular spring mounted concentric to a pin or wire that passes freely through the center of the circular spring. When motion detector 72-1 experiences any significant amount of motion, the spring deflects and touches the pin or wire to complete an electrical circuit. When the motion stops, the surrounding spring returns to its quiescent state wherein the pin or wire is not contacted. Such motion detectors are well-known in the art and desirable for use in conjunction with subsystem 60 due to their modest power requirements.

To measure traveled distance, DR navigation system 72 may utilize motion detector 72-1 as a pedometer; that is, DR navigation system 72 may utilize motion detector to measure the number of steps taken by a user. To estimate the direction traveled, DR navigation system 72 usefully further employs a compass, such as electronic compass 72-2. Utilizing information provided from DR navigation system 72 relating to distance and direction of movement, controller 66 may estimate the location of keyfob 20 relative to a reference point such as the vehicle location, in the well-known manner.

In certain embodiments, vehicle location system 60 may include a conventional GPS navigation system 74 with antenna 75. When able to receive satellite signals of sufficient quality, GPS navigation system 74 may be utilized to determine the location of keyfob 20. However, in the absence of GPS data, subsystem 60 may determine its location by reference to node location data provided by one or more wireless network nodes as described above. Elements 72, 74, 76 are collectively referred to as tracking system 81 and it should be understood that tracking system 81 can include any combination or subset of elements 72, 74, 76.

Figure 8:
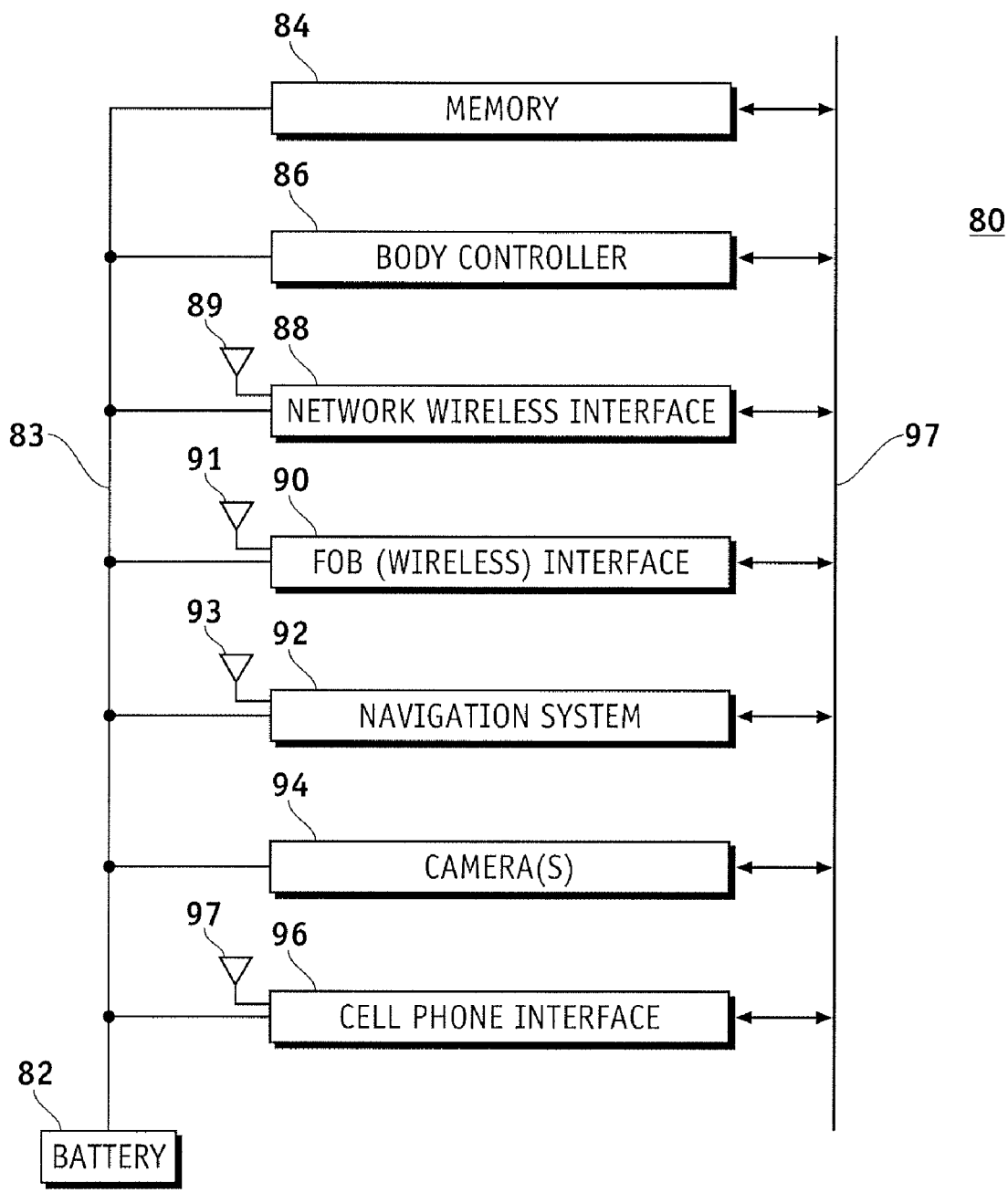
FIG. 8 is a block diagram of a vehicle mounted electronics system adapted to interface with the portable vehicle location system of FIG. 7, according to yet further embodiments.

FIG. 8 is a block diagram of vehicle mounted electronics system 80 adapted to interface with portable vehicle location system 60 of FIG. 7 of keyfobs 20 of FIGS. 1-6. System 80 comprises battery or other energy source 82 which is coupled to the various elements of system 80 via power bus 83. System 80 comprises memory 84 in which resides the software for operating system 80 as well as data to be downloaded to system 60 of keyfobs 20 of FIGS. 1-6. Memory 84 desirably has non-volatile and volatile portions for long term and transient storage of information and data. System 80 further comprises: body controller 86 which manages the operation of system 80 as well as other functions within the vehicle normally referred to as the body electronics; optional network wireless interface 88 with antenna 89 for communicating with an external network as for example and not intended to be limiting, a network of local nodes including security cameras and photographic satellites; keyfob interface 90 (with antenna 91 in the case of a wireless interface) for communicating with related system 60 located in keyfob 20 and by which location information, map information, photos, etc., may be downloaded from the vehicle to the keyfob; navigation system 92 incorporating for example a GPS navigation receiver with antenna 93 (or any other form of position determining devices) adapted to receive signals from various GPS satellites from which the current position of the vehicle can be determined for subsequent transmission to the keyfob via interface 90; one or more cameras 94 for obtaining views of the vehicle environment, as for example, ahead, to the sides, to the rear of the vehicle, etc.; and optional cell phone interface 96 adapted to utilize available local cell-phone sites for determining the position of the vehicle. Cell phone interface 96 may include antenna 97 or may merely couple to a separate cell phone system elsewhere in the vehicle. Either arrangement is useful. Navigation system 92 may also include a dead reckoning (DR) navigation system that operates in combination with a GPS receive to fill in gaps in GPS coverage or operates independently thereof, according to the desires of the system designer. Bus 97 generally extends to other vehicle sub-systems (not shown) so that controller 86 can, in response to commands from keyfob system 60, lock or unlock the vehicle, start the engine, unlock the trunk, report on the status of various vehicle sub-systems, and so forth. The elements illustrated in system 80 are generally those that are useful for interaction with system 60 of FIG. 5 and keyfob 20 of FIGS. 1-6 for providing RETURN-TO-VEHICLE information. Other well known vehicle electronics elements are omitted to avoid obscuring the invention. Antennas 89, 91, 93, 97 may each be single antennas or a plurality of antennas or an array of distributed antennas, depending upon the vehicle and desired antenna configuration.

Figure 9:
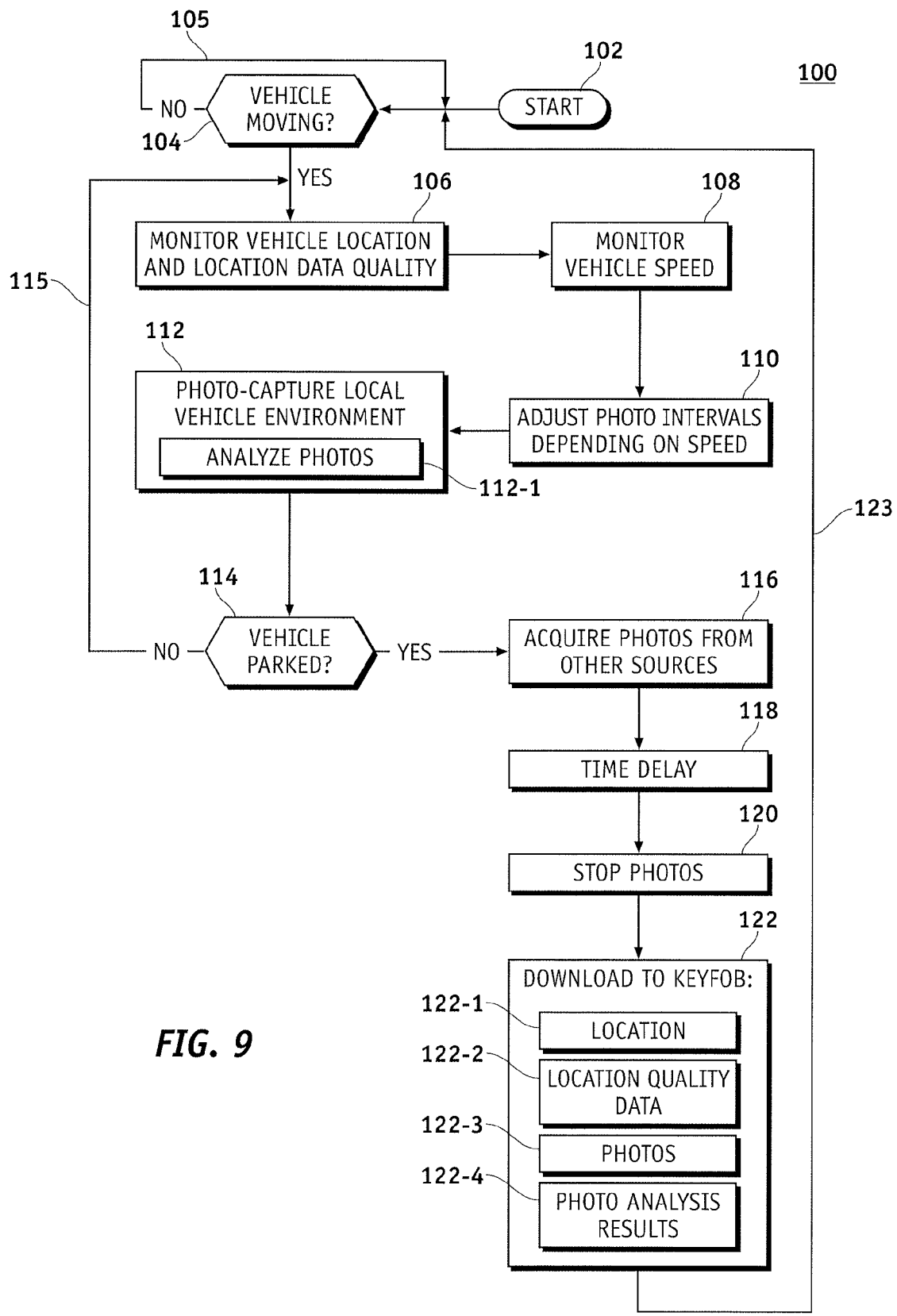
FIG. 9 is a flowchart illustrating an exemplary process utilized by the vehicle portion of the vehicle location system shown in FIG. 8 to provide location, photo and/or location quality information to the keyfob, according to yet still further embodiments.

FIG. 9 is a flowchart illustrating exemplary process 100 utilized by vehicle portion 80 of FIG. 8 of the vehicle location system, to provide location and/or photo information to keyfob 20 of FIGS. 1-6 and 7. Process 100 begins with START 102, which may occur when the ignition is turned ON. Initial query 104 is provided to determine if the vehicle is moving. If the outcome of query 104 is NO (abbreviated as "N") then method 100 returns to START 102 as shown by pathway 105. If the outcome of query 104 is YES (abbreviated as "Y"), then method 100 proceeds to MONITOR VEHICLE LOCATION AND LOCATION DATA QUALITY step 106 and subsequent steps. In step 106 data is collected regarding the vehicle location and the accuracy and completeness of the collected vehicle location information, for example and not intended to be limiting, the number of GPS satellites in use by the location monitoring system as the vehicle is parking, satellite signal strength, a list or a summary or of the local beacons encountered, an estimate of the uncertainty of the location information (e.g., horizontal information is accurate to +/−20 meters, altitude information is accurate to +/−1 meter, etc.). The quality of the location data will depend upon the number of satellites and/or local nodes that can be seen by vehicle navigation system 92 (see FIG. 8) and the signal to noise ratios of the received signals. It is up to the system designer to determine what level of location information confidence is deemed to be "adequate" and how it should be scored or rated, e.g., Q=0 to 4) as illustrated earlier or using some other scale, depending upon the overall system performance criteria that the designer has adopted and how this information should be assessed by or presented to the user.

Following step 106, method 100 desirably but not essentially proceeds to MONITOR VEHICLE SPEED step 108 wherein information on the current vehicle speed (S) is desirably captured. The vehicle speed S information obtained in step 108 is desirably but not essentially used in step 110 to adjust the interval at which vehicle cameras 94 (see FIG. 8) snap photos of the vehicle environment. For example, if the speed S is at or above magnitude S1 (e.g., about 5 miles per hour (MPH)), the photo interval τ is adjusted so that in PHOTO CAPTURE step 112, photos of the environment around the vehicle are taken about once every τ1 seconds (e.g., τ1~5 seconds). If the speed is less than S1, then the photo interval is reduced to interval τ2 <τ1 wherein, for example, the photos are taken once every τ2 seconds (e.g., τ2~1 second). Larger or smaller values of τ1 and τ2 can also be used. Having τ2<τ1 has the advantage of providing more photographs of the vehicle surroundings as it slows and parks. In step 112, cameras 94 (see FIG. 8) photograph the vehicle environment (e.g., ahead, to the sides, behind, etc.). This process occurs while the vehicle is still moving and as the vehicle slows and after it stops.

Method 100 proceeds to VEHICLE PARKED? query 114 or first to ANALYSE PHOTOS step 112-1 and then to query 114. In step 112-1 the photos taken in step 112 are optionally analyzed, for example using pattern recognition techniques, to extract, for example, and not intended to be limiting, alphanumeric information such as name(s) of the parking structure or building where the vehicle has entered, parking slot identifiers where the vehicle is parked, and other images of interest for location identification purposes. This is desirable but not essential. According to further embodiments, it is desirable to analyze a sequence of photos for the time period immediately preceding the vehicle coming to a "parked" condition, so that, for example, the name of the parking structure and the parking slot or stall that the vehicle has entered may be captured. It may also be advantageous in still further embodiments to record images with varying fields of view. For example, a short focal length lens could provide desirable content that would not be available from a long focal length image, i.e., more contextual information; and/or a long focal length lens may provide a less distorted image of a specific item, i.e., a "parking area 15E" location sign. Step 112-1 may be performed any time prior to step 122. The photos obtained in step 112 are taken using cameras 94 of FIG. 8. Operation of cameras 94 is controlled by body controller 86 and the photos captured in step 112 and analyzed in step 112-1 are stored in memory 84 of FIG. 8.

In VEHICLE PARKED? query 114 it is determined whether or not the vehicle has come to a stop and, optionally, the transmission placed in "park." If the outcome of query 114 is NO, then, as shown by path 115, method 100 returns to MONITOR VEHICLE LOCATION AND LOCATION DATA QUALITY step 106. If the outcome of query 114 is YES, then method 100 advances to ACQUIRE PHOTOS FROM OTHER SOURCES step 116, wherein photos (if available) are acquired from off-board databases via a wireless data connection (e.g., interface 88 of FIG. 8) or from onboard devices in the vehicle such as a laptop computer or personal digital assistant or cellular phone. Method 100 then advances to TIME DELAY step 118 and STOP PHOTOS step 120 wherein taking of further photos in step 112 is halted after the predetermined time delay of step 116 sufficient to insure, depending upon the photo interval then in use, that photos from the as parked vehicle are included in the photos captured and stored in step 112. In step 120, the photos captured and stored in steps 112 and 116 (optionally analyzed in step 112-1 if included), are then downloaded to keyfob 20. Download step 122 includes one or more of (i) sub-step 122-1 wherein vehicle location information is downloaded, (ii) sub-step 122-2 wherein location quality data is downloaded (e.g., how reliable is the location data), (iii) sub-step 122-3 wherein the above-described photos are downloaded, and (iv) sub-step 122-4 where the results of photo analysis step 112-1 are downloaded. Following download step 122, method 100 returns to START 102 as shown by path 123. Method 100 insures that photo information concerning the vehicle environment will be downloaded to keyfob 20 under any circumstances independent of whether reliable location information is or is not available, and that if reliable location information is available the location information, location quality information and photo information will be downloaded to keyfob 20. Thus, the present invention provides for multimode operation. Downloading location quality information is desirable but not essential.

Figure 10:
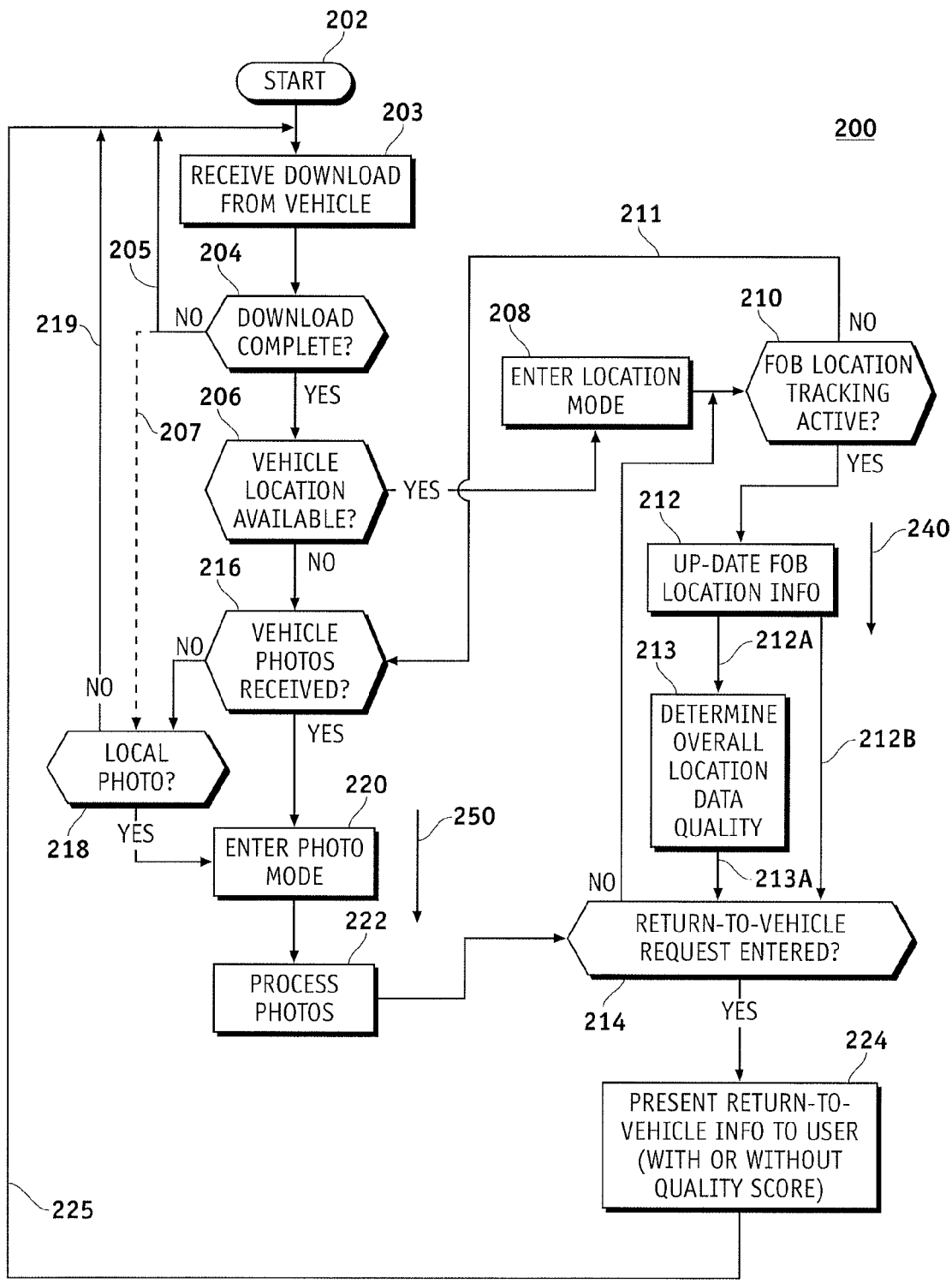
FIG. 10 is a flowchart illustrating an exemplary process utilized by the keyfob portion of the vehicle location system shown in FIG. 7 to receive location, photo and/or location quality information from the vehicle and further process it and present return-to-vehicle information when requested by the user, according to still yet further embodiments of the invention.

FIG. 10 is a flowchart illustrating exemplary process 200 utilized by system 60 (see FIG. 7) of keyfob 20 (see FIGS. 1-6) of the vehicle location system, to receive location, location quality and/or photo information from the vehicle and further process it and present RETURN-TO-VEHICLE (RTV) information when requested by the user. Method 200 begins with START 202 and initial RECEIVE DOWNLOAD step 203, wherein vehicle location, location quality and/or photo information is transferred from vehicle location subsystem 80 to subsystem 60 in keyfob 20 using interface 90 of vehicle subsystem 80 and interface 70 of keyfob subsystem 60. This should occur just after the vehicle is parked and before or just as keyfob 20 is being removed from the parked vehicle and is still in communication range of the vehicle. Query 204 is executed to confirm that the download is complete. If the outcome of query 204 is NO, then method 200 returns to START 202 as indicated by path 205 and loops until the download is complete. In an alternate embodiment, path 207 is used to check whether a local photograph taken by optional camera 41, 77 of keyfob 20 is available. If the outcome of query 204 is YES confirming that a download of location, location quality and/or photo information from the vehicle has been received and stored in memory 64 of keyfob subsystem 60, then method 200 proceeds to query 206 wherein it is determined whether or not the download includes vehicle location information, as from step 122-1 of FIG. 9. If the outcome of query 206 is YES then method 200 proceeds to ENTER LOCATION MODE step 208, wherein keyfob subsystem 60 attempts to develop RETURN TO VEHICLE (RTV) information based on using the now known vehicle location as a starting point and employing tracking systems 81 of FIG. 7 to provide updated keyfob locations as the keyfob moves away from the vehicle. Query 210 is provided to determine whether or not such location tracking capability (e.g., tracking system 81) within keyfob 20 is active, that is, able to provide further location information about the keyfob as it moves. If the outcome of query 210 is YES, then in step 212, the current keyfob location relative to the vehicle is updated using the output of one or more of keyfob tracking system 81. Method 200 then can proceed according to several embodiments as indicated by paths 212A, 212B. According to path 212A, method 200 proceeds to step 213 wherein the overall location quality is assessed. It will be understood by those of skill in the art based on the teachings herein, that the quality of the location information derived from step 212 depends upon both the quality of the location information downloaded from the vehicle and the quality of the location tracking (e.g., using tracking system 81) performed by the keyfob itself. For example, assuming that both the vehicle and the keyfob are using GPS tracking systems, the vehicle may be able to receive signals from 6-8 satellites and have a high quality GPS location solution (e.g., Q=4) while the keyfob itself may only be able to receive signals from fewer satellites and so have lower quality location tracking information (e.g., Q=2). In these circumstances, the overall location quality will degrade as the keyfob moves away from the vehicle so that the overall quality may only correspond to location information resolved by the keyfob itself, (e.g., overall Q=2-3) depending upon its distance from the vehicle. In any case, method 200 proceeds from step 212 via step 213 as shown by paths 212A, 213A or directly from step 212 to step 214 as shown by path 212B.

In query 214 it is determined whether or not a RETURN-TO-VEHICLE (RTV) request has been generated, e.g., by the user activating one or the other of buttons 23 and/or scroll wheel 43 as has been previously described. If the outcome of query 214 is NO, then method 200 returns to query 210 to determine whether the fob location tracking capability is still active. The loop 210, 212, (213), 214 repeats as long as the fob location tracking capability is active, thereby continually updating the keyfob location information relative to the vehicle location. While step 213 is illustrated as occurring prior to step 214, this is not essential. Step 213 may be executed anytime prior to step 224.

If the outcome of query 210 is NO, for example, because keyfob location tracking system 81 is unable able to receive the necessary signals or for whatever other reason, then method 200 proceeds to query 216 as shown by path 211. In query 216 it is determined whether or not vehicle environment photos have been received from the vehicle, as via download steps 122-3, 122-4 of FIG. 9. If the outcome of query 216 is NO, then method 200 advances to query 218 wherein it is determined whether or not camera 41, 77 of keyfob subsystem 60 was used to take a photo related to the parked vehicle location and store it in memory 64. If the outcome of query 218 is NO, indicating that no photos are available either from vehicle subsystem 80 or from fob subsystem 60 and that no keyfob location information relative to the vehicle is available, then method 200 returns to START 202 as shown by path 219.

If the outcome of either query 216 or 218 is YES, the method 200 advances to ENTER PHOTO MODE step 220, wherein keyfob subsystem 60 will make use of such photo information to assist the user in returning to the vehicle. This photo information, as for example but not intended to be limiting, from a photo obtained by keyfob camera 41, 77, is desirably but not essentially analyzed in optional PROCESS PHOTOS step 222 to highlight features of the photo(s) that are particularly useful in guiding the user back to the vehicle. When the user enters a RETURN-TO-VEHICLE (RTV)

request, that is, when the outcome of query 224 is YES, then subsystem 60 presents the RETURN-TO-VEHICLE (RTV) information to the user in step 224. If the download included vehicle location information and one or more of keyfob location tracking elements 72, 74, 76 of tracking system 81 are active, then method 200 (e.g. via path 240) presents this location information (and optionally location quality information), as for example is shown in FIGS. 1-3. If the downloaded information did not include vehicle location information and/or none of keyfob location tracking elements 72, 74, 76 is able to provide updated keyfob locations relative to the vehicle, then method 200 (e.g., via path 250) will present the available photo information, as for example is shown in FIG. 4. If location (location quality) and photo are available, then the combination can be presented as illustrated for example in FIG. 5. In either case, useful information is provided to the user to assist him or her in returning to the vehicle. If the vehicle and keyfob environments are such that both location information and photos are available to the keyfob, then both are presented, as shown for example in FIG. 5. Thus, the invented arrangement and method is a multi-mode capable system and method, wherein the system and method automatically adapt to variations in the availability of, for example, GPS signals, and/or local beacon signals, and/or cell phone signals and/or dead reckoning capability and/or images to still provide assistance to the user in returning to his or her vehicle by means of timely stored photos from the location of the parked vehicle. This is a new and very useful capability. The results of this multimode approach are presented to the user on screen 42 of keyfob 20 or by use of annunciator 59 or other output means well known in the art. Following PRESENT RTV INFORMATION TO THE USER step 224, method 200 returned to start 202 as shown by path 225.

In view of the above, it should be appreciated that a multi-mode parked vehicle location system and method have been provided that may guide a user back to his or her vehicle. While able to use satellite signals or local beacon signals or cell phone signals if available, even in the absence of such signals, a photo capture feature and method is automatically or manually provided that makes RETURN-TO-VEHICLE (RTV) information available to the user.

Figure 11:
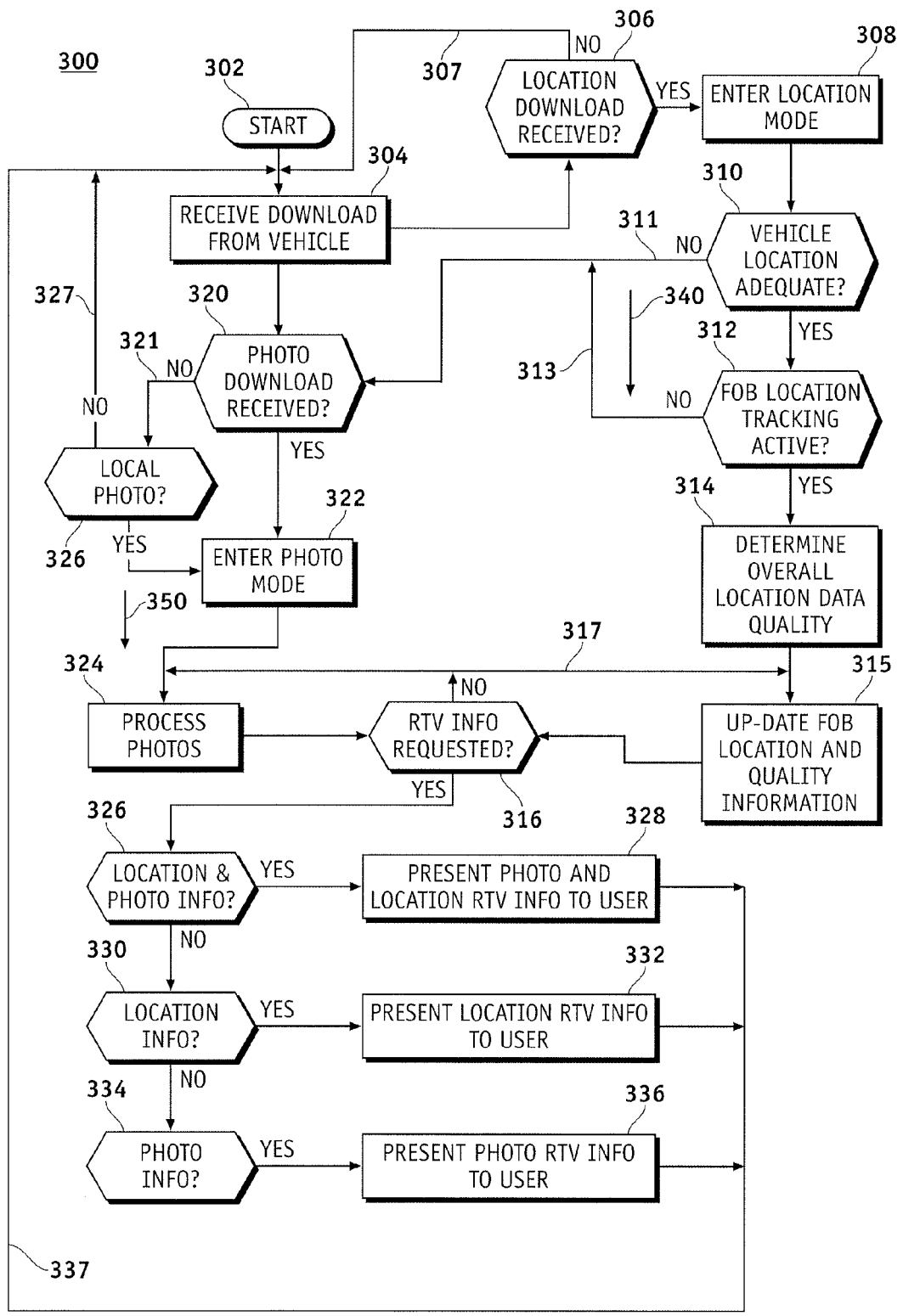
FIG. 11 is a flowchart illustrating an exemplary process analogous to that of FIG. 10, but according to additional embodiments of the invention

FIG. 11 is a flowchart illustrating exemplary method 300 analogous to that of FIG. 10, but according to additional embodiments of the invention. Method 300 provides two pathways to providing return-to-vehicle (RTV) information to the user, path 340 where positional information provided by the vehicle and tracking information developed within the fob is used to provide location information in response to a RTV information request, and path 350 where photo information developed within the vehicle and/or the keyfob is used to provide RTV information in response to a RTV information request, or a combination of paths 340, 350 wherein both kinds of information are provided depending upon the nature of the user's RTV information request.

Method 300 begins with START 302 and initial step 304 wherein a download such as has been discussed in connection with FIG. 9 is received from the vehicle, for example, via interface 70 of FIG. 7 and interface 90 of FIG. 8. In query 306 it is determined whether the download of step 304 contains location information (and desirably also quality information). If the outcome of query 306 is NO, then method 300 loops back to START 302 as shown by path 307. If the outcome of query 306 is YES, then according to path 340, method 300 advances to ENTER LOCATION MODE step 308 and query 310 wherein the location and quality of the download information is examined to determine whether the vehicle location information is adequate, that is, sufficiently accurate for further processing in keyfob 20 to give a location based output to the user. If the outcome of query 310 is NO, indicating that the quality of the vehicle location information received from the vehicle download, is inadequate, them method 300 proceeds to PHOTO DOWNLOAD RECEIVED query 320 as shown by path 311, and location information path 340 (as opposed to photo information path 350) is abandoned. If the outcome of query 310 is YES, then method 300 proceeds to query 312 wherein it is determined whether or not one or more of the navigation or position locating elements 72, 74, and/or 76 (collectively tracking system 81 of FIG. 7) internal to keyfob 20 is active so as to be able to track the location of keyfob 20 relative to the vehicle position. If the outcome of query 312 is NO, indicating that the keyfob tracking system 81 is inoperative for whatever reason, then method 300 proceeds to PHOTO DOWNLOAD RECEIVED query 320 as shown by path 313, with the same result as by path 311. If the outcome of query 312 ifYES indicating that keyfob 20 is able to use the initial position of the vehicle and subsequent movement of the keyfob to determine a current location of keyfob 20 in UP-DATE FOB LOCATION INFO step 315, with optional intervening overall quality determining step 214. The updated location and location quality information is then available when an RTV info request is received in query 316.

Returning again to DOWNLOAD step 304, method 300 proceeds to PHOTO DOWNLOAD RECEIVED query 320 wherein it is determined whether the vehicle has transmitted vehicle environment photo information to keyfob 20. If the outcome of query 320 is NO, then method 300 proceeds to LOCAL PHOTO query 326 wherein it is determined whether or not a local photo from the vehicle location has been taken by the user. If the outcome of query 326 is NO, indicating that no photo information either local or from the vehicle is available, then method 300 returns to start 302 s illustrated by path 327. If the outcome of query 320 or query 326 is YES, then method 300 proceeds to ENTER PHOTO MODE step 322 and optional PROCESS PHOTOS step 324 wherein generally the same type of processing described in connection with step 112-1 of FIG. 9 and/or step 222 of FIG. 10 is optionally performed. Method 300 then proceeds to RTV INFO REQUEST query 316, the same destination that could be reached via path 340 from UP-DATE step 314.

Query 316 determines whether or not the user has asked for information on how to return to his or her vehicle. If the outcome of query 316 is NO, then method 300 returns to step 324 for photo information and step 315 for location information and method 300 cycles so as to maintain updated information until the outcome of query 316 is YES. When the outcome of query 316 is YES, then method 300 advances through queries 326, 330, 334 in any order, to determine what type of RTV information has been requested by the user. If the user has requested both location and photo information (query 326), then in step 328 photo and location information such as is illustrated for example in FIG. 5, is presented to the user on display 42 and/or annunciator 59 or a combination thereof. If location quality information is available, it is desirably included. If the user has requested only location information (query 330), then in step 332 only location (and location quality) information is presented such as is illustrated for example in FIGS. 1-3 to the user on display 42 or annunciator 59, light bar 45 and/or a combination thereof. If the user has requested only photo information (query 334), then in step 336 only photo information such as is illustrated for example in FIG. 4, is presented to the user on display 42 and/or annunciator 59 or a combination thereof. Following any of presentation steps 328, 332, 336 method 300 returns to START 302 as shown by path 337. In view of the above, it should be appreciated that a multi-mode parked vehicle location system and method have been provided that may guide a user back to his or her vehicle. While able to use satellite signals or local beacon signals or cell phone signals if available, even in the absence of such signals, a photo capture feature and method is automatically or manually provided that makes RETURN-TO-VEHICLE (RTV) information available to the user.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any manner. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electronic device for directing a user to a parked vehicle, comprising:
   an interface configured to receive photographic information concerning vehicle location from the vehicle;
   a display for presenting return-to-vehicle (RTV) information to the user;
   a memory;
   a controller coupled to the interface, the memory and the display, the controller configured to store the photographic information in the memory and present at least a portion of the photographic information on the display in response to a RTV request by the user.

2. The device of claim 1, further comprising:
   an on-board camera in the device, adapted to photograph recognizable landmarks in the vicinity of the parked vehicle;
   wherein such recognizable landmarks are stored in the memory and sent to the display by the controller in response to a RTV request by the user.

3. The device of claim 1, wherein the interface receives other vehicle location information from the vehicle, which information includes further information on the quality of the vehicle location information provided to the device via the interface; and
   wherein the device further comprises a display element coupled to the controller and adapted to present vehicle location quality information to the user.

4. The device of claim 3, wherein the display element comprises a light bar having multiple lights whose different colors are indicative of the quality of the location information available in the device.

5. The device of claim 3, wherein the display element comprises an icon presented on the display whose shape or color or both varies according to the quality of the location information available in the device.

6. The device of claim 3, wherein the location quality information presented to the user combines location quality information downloaded from the vehicle and the quality of location information developed within the device itself in response to motion of the device away from the vehicle.

7. The device of claim 1, further comprising:
   an input means coupled to the controller and adapted to be actuated by the user to select the type of RTV information to be presented to the user on the display.

8. The device of claim 7, wherein the input means comprises:
   a button adapted to be actuated by the user to control functions to be executed by the device; and
   a scroll wheel adapted to be actuated by the user to provide alternative functions to be executed by the device.

9. A method of providing information useful in helping a user carrying a portable device to return to a parked vehicle, the method comprising:
   taking photos with a camera of the vehicle environment in the vicinity of the parked location;
   downloading using a controller, to the portable device, the photos of the vehicle environment in the vicinity of the parked location;
   generating a return-to-vehicle (RTV) request in response to the user activating a button on the portable device; and
   displaying to the user at a display on the portable device, images based at least in part on the photos of the vehicle environment in the vicinity of the parked location in response to the return-to-vehicle (RTV) request.

10. The method of claim 9, wherein the step of taking photos occurs in the vehicle as the vehicle is being parked and the photos or images or both are downloaded from the vehicle to the portable device for presentation to the user.

11. The method of claim 9, wherein the step of taking photos occurs in the portable device.

12. The method of claim 10, wherein the photos are taken at predetermined intervals.

13. The method of claim 12, further comprising, adjusting the interval at which the photos are taken depending upon the vehicle speed.

14. The method of claim 13, wherein the interval at which the photos are taken becomes shorter as the vehicles slows.

15. The method of claim 10, wherein at least some of the photos are taken after the vehicle is parked.

16. The method of claim 9, wherein the step of downloading the photos of the vehicle environment comprises;
   wirelessly obtaining images related to the parked vehicle's location from a system external to the vehicle.

17. A multi-mode electronic device configured to be carried on a user's person for directing the user to a parked vehicle, the electronic device comprising:
   an interface in the device configured to receive vehicle location information and vehicle environment image information from the vehicle;
   a display in the device for presenting return-to-vehicle (RTV) information to the user;
   one or more location tracking elements in the device adapted to track movement of the device from the vehicle;
   a controller and memory in the device, coupled to the one or more location tracking elements, the interface and the display, wherein the controller is configured to:
   store in the memory, vehicle location information and vehicle environment image information received via the interface;
   update current device location information by combining location information received from the vehicle with information derived from the one or more location tracking elements for movement of the device from the vehicle after it is parked, to provide a current device location relative to the parked vehicle location; and
   in response to a RETURN-TO-VEHICLE (RTV) assistance request from the user, present on the display image information, location information or a combination thereof.

18. The device of claim 17, wherein the information presented on the display includes information on the quality of the location information.

19. The device of claim 17, wherein image information is derived from one or more cameras located on the vehicle.

20. The device of claim 17, wherein image information is derived from one or more systems external to the vehicle.

* * * * *